(12) United States Patent
Jayadev

(10) Patent No.: US 6,860,431 B2
(45) Date of Patent: Mar. 1, 2005

(54) STRATEGIC-RESPONSE CONTROL SYSTEM FOR REGULATING AIR CONDITIONERS FOR ECONOMIC OPERATION

(76) Inventor: Tumkur S. Jayadev, 1132 Little Oak Cir., San Jose, CA (US) 95129

( * ) Notice: Subject to any disclaimer, the term of this patent is extended or adjusted under 35 U.S.C. 154(b) by 0 days.

(21) Appl. No.: 10/617,268

(22) Filed: Jul. 10, 2003

(65) Prior Publication Data

US 2005/0005621 A1 Jan. 13, 2005

(51) Int. Cl.[7] .............................................. G05D 23/00
(52) U.S. Cl. ..................... 236/47; 236/46 R; 236/46 F; 62/176.6; 307/39; 165/12
(58) Field of Search ............................... 62/179, 176.1, 62/176.6, 157, 158, 231; 236/47, 46 R, 46 F, 51; 165/12, 267, 238; 307/39

(56) References Cited

U.S. PATENT DOCUMENTS

| | | | | |
|---|---|---|---|---|
| 4,274,475 A | * | 6/1981 | Rall et al. ..................... 165/211 |
| 5,462,225 A | * | 10/1995 | Massara et al. ............... 236/47 |
| 5,816,491 A | * | 10/1998 | Berkeley et al. ........... 236/46 R |
| 5,924,486 A | * | 7/1999 | Ehlers et al. ................. 165/238 |
| 6,622,926 B1 | * | 9/2003 | Sartain et al. ............. 236/46 R |
| 6,631,622 B1 | * | 10/2003 | Ghent et al. ................... 62/231 |

* cited by examiner

*Primary Examiner*—Harry B. Tanner
(74) *Attorney, Agent, or Firm*—Richard Esty Peterson, Esq.

(57) ABSTRACT

A strategic response control for an air conditioning system for use in an environment with increased power rates during a designated peak period. The air conditioning system includes a power board for operating the air conditioning system in one or more operating status having a controller with a processor and a real time clock, an indoor temperature sensor for generating an input signal representing the indoor temperature, an outdoor temperature sensor for generating an input signal representing the outdoor temperature, and an operating program that sets a maximum comfort level temperature, a minimum comfort level temperature and a warmup rate for the environment in which the air conditioner operates, and has a procedure for precooling the environment before the peak period, wherein on activation, the processor signals the power board to enter an operating state for precooling and an "off" or lower level operating state during the peak period.

20 Claims, 13 Drawing Sheets

Energy Saver in Peak Reduction Mode for 3-Level System

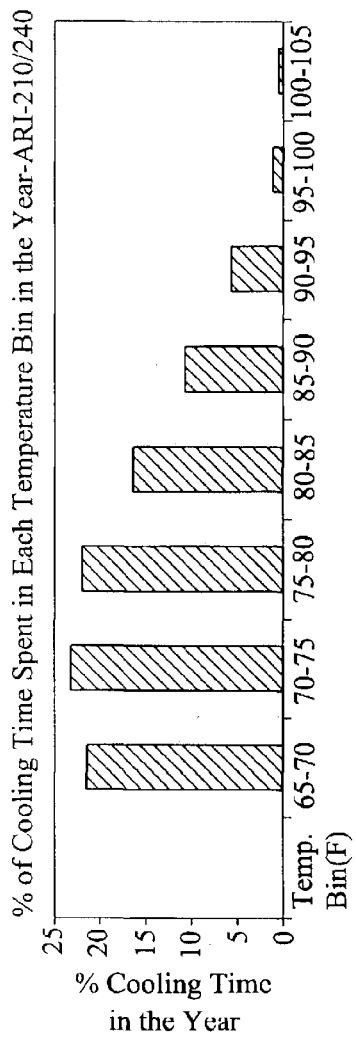
FIG. 3A
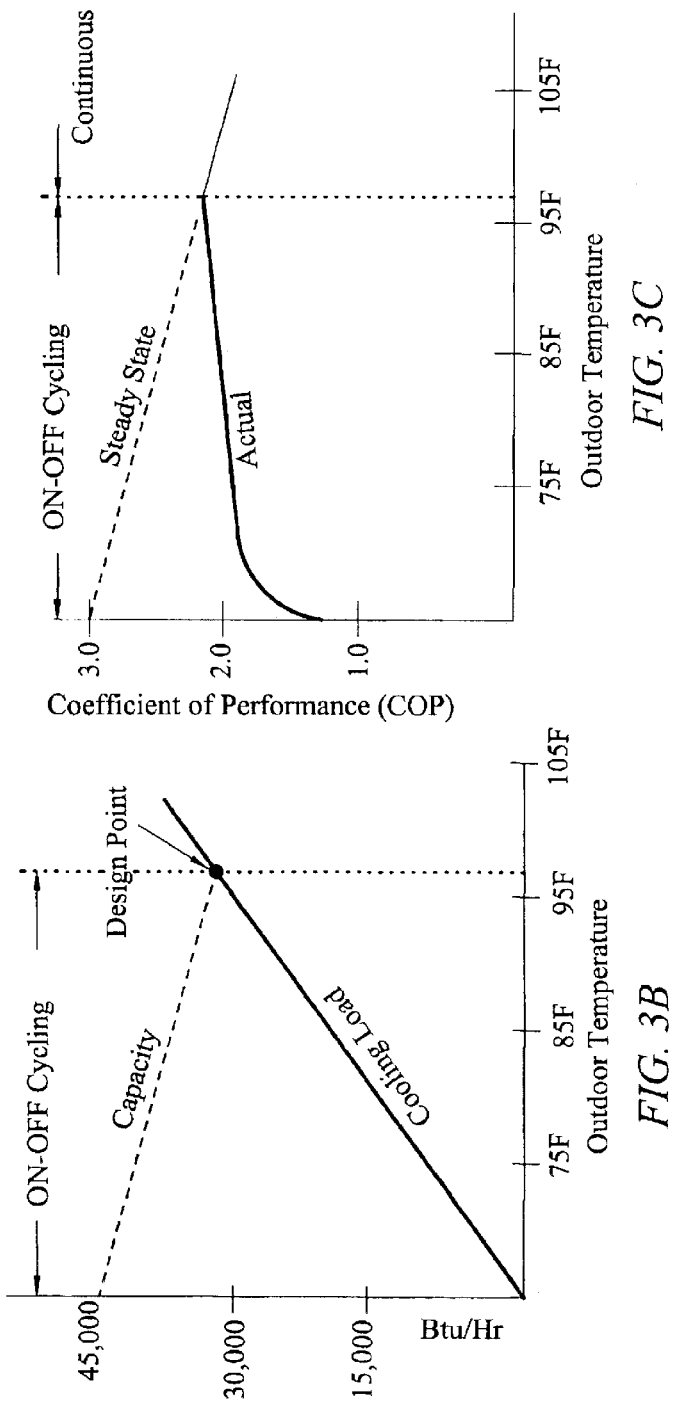
FIG. 3C
FIG. 3B

| $T_{outside}$ | Indoor temperature | | | Time A/C was ON, t ON | Rate of Cooling Delta T/t ON | | |
|---|---|---|---|---|---|---|---|
| | At start of cooling | At end of cooling | Delta T | | Level 1 | Level 2 | Level 3 |
| | | | | | | | |

*FIG. 5A*

| $T_{outside}$ | Indoor temperature | | | Time A/C was OFF, t OFF | Rate of Warming Delta T/t OFF |
|---|---|---|---|---|---|
| | At start of warming | At end of warming | Delta T | | |
| | | | | | |

*FIG. 5B*

STRATEGIC-RESPONSE CONTROL SYSTEM FOR REGULATING AIR CONDITIONERS FOR ECONOMIC OPERATION

BACKGROUND OF THE INVENTION

The strategic-response control system of this invention is an apparatus and control system, and, a method of operation of the control system to maximize the real-time economic operating efficiency of a multi-speed air conditioner.

In this invention, a speed controller for efficiently operating an air conditioner at multiple speeds of the type disclosed in co-pending application Ser. No. 10,305,933 entitled, Controller for Air Conditioners and Heat Pumps, is preferred to maximize the options for regulated operation with cost savings as a primary objective.

The control system of this invention has been devised to maximize economic efficiencies of operating an air conditioner or an air conditioning system in a real-time environment where energy rates vary. The control system has a program that implements protocols for economic operation of the air conditioner or air conditioning system, while maintaining an acceptable comfort level in the environment regulated.

The recent development of state of the art, controller-regulated air conditioners that operate at multiple speeds has added a new factor in a control strategy for economic air conditioning. A multi-speed air conditioner with substantially improved energy efficiencies and operating efficiencies at lower speeds permits a programmed operation to result in significant savings when switching to the lower speeds. The strategic-response control system of this invention is preferably applied to an air conditioner or air conditioning system of this type. In this specification a multi-speed air conditioner includes air conditioning systems or air conditioner networks that operate at multiple capacity levels with significant energy savings at lower levels.

In many modern urban and industrial areas, energy rates vary at different times during the day. Energy costs during "peak hours" typically 3 p.m. to 6 p.m., are greater than costs during the remaining hours. As energy supplies are networked over greater areas for improved flexibility in meeting demand, not only will varied rates extend over greater areas but it is likely that more complex rate schedules will be introduced.

In order to economically operate an air conditioner, which is typically a significant energy user, in an environment that has a variable rate schedule, a complex response strategy is required.

SUMMARY OF THE INVENTION

The strategic response control system for regulating air conditioners of this invention relates to a control apparatus and a method of operation for air conditioners or air conditioning systems in a variable rate energy environment for economical operation while maintaining an acceptable comfort level. Although the control strategy described in the detailed description of this invention is for an air conditioner or air conditioning systems under customer control for realizing cost savings to the customer, this strategy may be applied by the utility where it has control of customer systems of the type described, and it seeks to curtail peak energy demands and avert a brown-out or blackout, while minimizing adverse effects of reduced energy supply to the customers.

A significant improvement in the strategic response control system of this invention is an air conditioner or air conditioning system that operates at multiple capacity levels without substantial loss in operating efficiencies at lower capacity levels. Ordinarily, a conventional air conditioner does not exhibit significant energy reductions when output capacity is reduced. However, because of the substantial demands of air conditioning systems during the same hours that industrial and commercial energy demands peak, control systems have been devised to operate air conditioning systems at reduced capacity levels with corresponding reduction in energy use.

As noted, one such control system is described in U.S. patent application Ser. No. 10/305,933, entitled, "Controller for Air Conditioners and Heat Pumps", filed on Nov. 26, 2002, and incorporated herein by reference. In the referenced patent application, a controller device is described for controlling the speed of a single phase motor in air conditioners and heat pumps. The described controller device operates a single phase, permanent split capacitor motor at two distinct speeds without adverse reduction in torque for maintaining the torque requirement of a compressor cycle. It is to be understood that the strategic response control system of this invention is also designed for use in other controlled air conditioners and air conditioning systems having multiple capacity levels of operation, including 3-phase motor driven air conditioning system where lower levels of operation provide significant energy savings. It is also to be understood that the strategic response control system of this invention can be applied in a limited manner to a conventional air conditioning system where the states of operation are simply "on" or "off."

In the description of the preferred embodiments, air conditioners or air conditioning systems having the two or the more complex three modes of operation are described as examples of multi-level operating systems controlled by the control system of this invention.

The control system preferably includes a controller with a processor to coordinate a plurality of inputs from sensors and commands that automatically result from pre-programmed conditions or commands that are input by system users. The processor may be a stand-apart computer such as a conventional personal computer or an inexpensive embedded processor of equal or more limited capabilities that is incorporated into the electronics of the controller unit. The preferred controller unit includes a read/write memory allowing a look-up table to be generated and modified as a result of the experiences of actual use. Modeling an installation using commonly described mathematical modeling techniques in the literature may not be accurate. Additionally, changes in the efficiency of an installed cooling system over time because of duct leakage, filter clogging etc., may require revision of operating parameters. Similarly, the thermal storage conditions of an indoor environment may change as a result of changes in furniture, insulation, natural lighting or building modifications.

The controller unit includes a real-time clock for coordinating operations of the processor with a tariff schedule for calculating energy costs at different times during the day or week and a communication component for providing remote input by a user or utility. This component preferably uses an open interface for signal transfer, i.e. the internet telephone, pager or other land line or wireless communication device.

In the strategy of operation of this system, the times of increased power costs are determined. Using a predetermined thermal time constant of the environment cooled, the air conditioning system is turned on at normal full power mode a calculated time before the peak price period for power begins in order to cool the environment at or below the standard comfort level. The air conditioning is turned off during the peak price period. If during this period temperatures rise to a level predicted to exceed the standard or acceptable comfort level, then the air conditioning system is turned on and operated at a reduced capacity level until the end of the peak price period, or until the acceptable comfort level is achieved. At the end of the peak price period, the air conditioning system is operated at normal full power capacity. During periods of reduced capacity operation, the air conditioning system is under thermostatic control and is turned off if the desired comfort level is achieved before the end of the peak price period.

Where the thermal storage of the environment to be cooled is such that the time constants are long, the air conditioning may be completely off during the entire peak period. As noted, this limited strategy is applied to air conditioning system having only "on" and "off" levels of operation.

The flexibility of a system having multiple capacity levels in addition to an off state allows for programming the reduced capacity level to begin a predetermined time before the end of the peak price period, after being in an off state.

In addition, by separating the air conditioner fan operation from the compressor operation, additional savings can be generated by continuing fan operation for a predetermined time after the air conditioning compressor is turned off, and regulating the speed of the condenser fan and evaporator fan according to optimum profiles for different capacity levels of an air conditioning operation.

These and other features of the strategic response control system of this invention are described in greater detail in the Detailed Description of the Preferred Embodiments of this specification.

BRIEF DESCRIPTION OF THE DRAWINGS

FIG. 3A is an illustration of a bar chart for cooling time in designated temperature ranges.

FIG. 3B is an illustration of a graph of cooling load and air conditioner capacity for specified temperatures.

FIG. 3C is an illustration of a graph of coefficient of performance of air conditioners for specified temperatures.

FIG. 5A is a data format for a lookup table for a three-level cooling system.

FIG. 5B is a data format for a lookup table for warming rates to calculate cooling time constants.

DETAILED DESCRIPTION OF THE PREFERRED EMBODIMENTS

The strategic-response control system of this invention regulates air conditioners and air conditioning systems for economical operation in a variable rate energy environment. A variable rate energy environment is typically one where energy charges during one or more periods during the day or week exceed normal rates in order to encourage energy reduction during times that energy use strains the capacity of an energy supplier to meet energy demands.

In modern energy supply networks, a utility is frequently charged higher rates for power delivered by networked power suppliers during periods of power scarcity due to increased energy demands by the end user. These charges are passed on to the customer by increased rates for energy during certain high-use periods of the day, for example, from 3 p.m. to 6 p.m. during the week day. The rates during this period may be four or five times the rate during other periods and encourage strategies of selective energy conservation having economic incentives. The control system of this invention has been devised to generate significant savings in such multiple-rate environments and can be tailored for more complex rate systems.

The strategic-response control system takes advantage of the thermal storage characteristics of the indoor environment cooled by the air conditioner or air conditioning system being regulated. In this description, the term air conditioner is used and includes air conditioning systems and networked air conditioners preferably having multiple capacity levels of operation. One such system is described in the referenced patent application.

Figure 1:
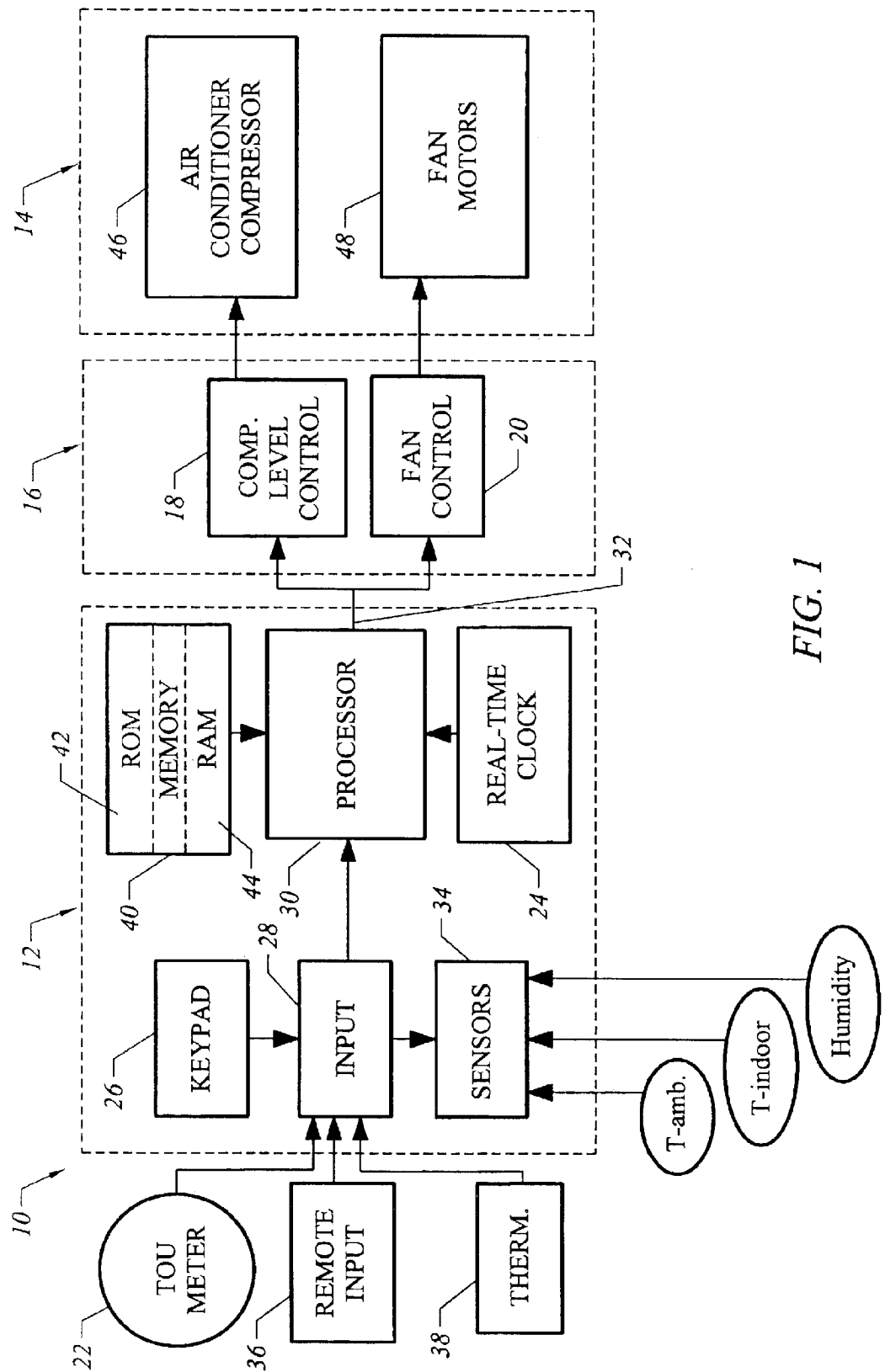
FIG. 1 is a block diagram of the air conditioner control system of this invention.

Referring to the diagrammatic view of FIG. 1 the control system is designated by the reference numeral 10. The control system includes a programmable controller 12 connected to an air conditioner 14.

The controller 12 and air conditioner 14 are interconnected by a power board 16. The controller 12, air conditioner 14 and power board 16 are represented by dotted line boxes in FIG. 1 and it is to be understood that the power board 16 which includes the electronics for a compressor capacity level control 18 and a fan system control 20 is incorporated as a part of the programmable controller 12 or alternatively incorporated and sold as a part of the air conditioner 14.

The time of use power meter 22 is shown connected to the programmable controller 12 allowing the controller 12 to sense the current and voltage and coordinate the real-time clock 24 of the controller 12 with the internal timing of the power meter 22. Where the time of use power meter 22 is under the exclusive control of the utility, the time of beginning and ending of high tariff rates for energy usage can be entered by the customer using a key pad 26 for inputting settings to an input register 28 for a microprocessor 30. The microprocessor coordinates inputs according to a program for generating signals at a low voltage output 32 that controls the higher voltage power board 16 and hence, the operation of the air conditioner. Additionally, the key pad 26 can be used for entering settings of other customer preferences such as the upper comfort level temperature, the lower comfort level temperature, and the lowest acceptable temperature when the environment cooled is considered unoccupied.

Additional inputs from environmental sensors 34 include the outdoor ambient temperature, the indoor temperature and the indoor and outdoor humidity, which are employed to predict the duration of advance operation required as the time approaches the peak rate period and to determine if additional cooling is required as the end of this period approaches. The ambient temperature is measured at the air entrance to the compressor and the indoor temperature is measured at the air entrance to the evaporator. Similarly, the outdoor humidity is measured at the air entrance to the compressor and the indoor humidity is measured at the entrance to the evaporator. The humidity measurements are used to adjust the activating temperature for operation of the air conditioning system to the effective comfort level settings selected by the user. Additionally, the humidity measurements are used as an important factor in determining the speed and duration of the evaporator fan to prevent icing or excess condensation from accumulating on the evaporator when the air conditioner operation is operating at peak capacity or suspended during peak rate periods. Fan operations are also advantageously continued at a reduced speed with negligible energy cost to extract maximum cooling at the evaporator for transfer into the environment cooled, and to discharge residual heat at the compressor from the environment.

In addition to the inputs at the site of the regulated air conditioner 14, the strategic-response control system includes a remote input 36 that allows an off-site customer to override the energy saving control program of the controller 12 and return the system to a thermostatic control by a conventional thermostat 38. Additionally, in the preferred system, the remote input 36 is operable by a utility, particularly in extreme situations to avoid a brown-out or rolling blackout. In such situation a timing signal may optionally be sent that changes the pre-programmed peak rate period by advancing the start time or extending the end time. For example the 3 p.m. to 6 p.m. peak rate period may be changed to 12 noon to 8 p.m. with a corresponding advance of the precool period and/or a reduction in the capacity level of the air conditioner operation in the precool period that overlaps the extended rate period. This override may or may not include a change in the rate schedule as determined by the utility. Remote control of the controller 12 is accomplished by a conventional interface by internet, telephone, pager or similar line or wireless means. Preferably, the controller 12 is a client device on a network accessible through the internet.

In the example considered in FIG. 1, the air conditioner is a three-phase air conditioner 12 with three capacity levels of operation. It is to be understood the air conditioner may be a single phase air conditioner with a control system that provides two efficient capacity levels of operation as described in the referenced patent application. With three capacity levels of operation, the air conditioner may be operated in one of four operating states when the "off" state is included.

The microprocessor 30 includes a memory 40 preferably a read only memory 42 in combination with a read/write memory 44. The program for operating the microprocessor 30 and the basic program for controlling the operation of the air conditioner 14 are preferably stored in the read only memory 42. A look-up table used to generate and adjust parameters of operation together with updatable parts of the operating programs are preferably stored in the read/write memory 44 in accordance with conventional practices.

In the more complex control system 10 described, the air conditioner 14 has three levels of operation, and it is understood that the less complex two level, and in certain circumstances the single level air conditioner is controllable by the described schema.

Figure 2:
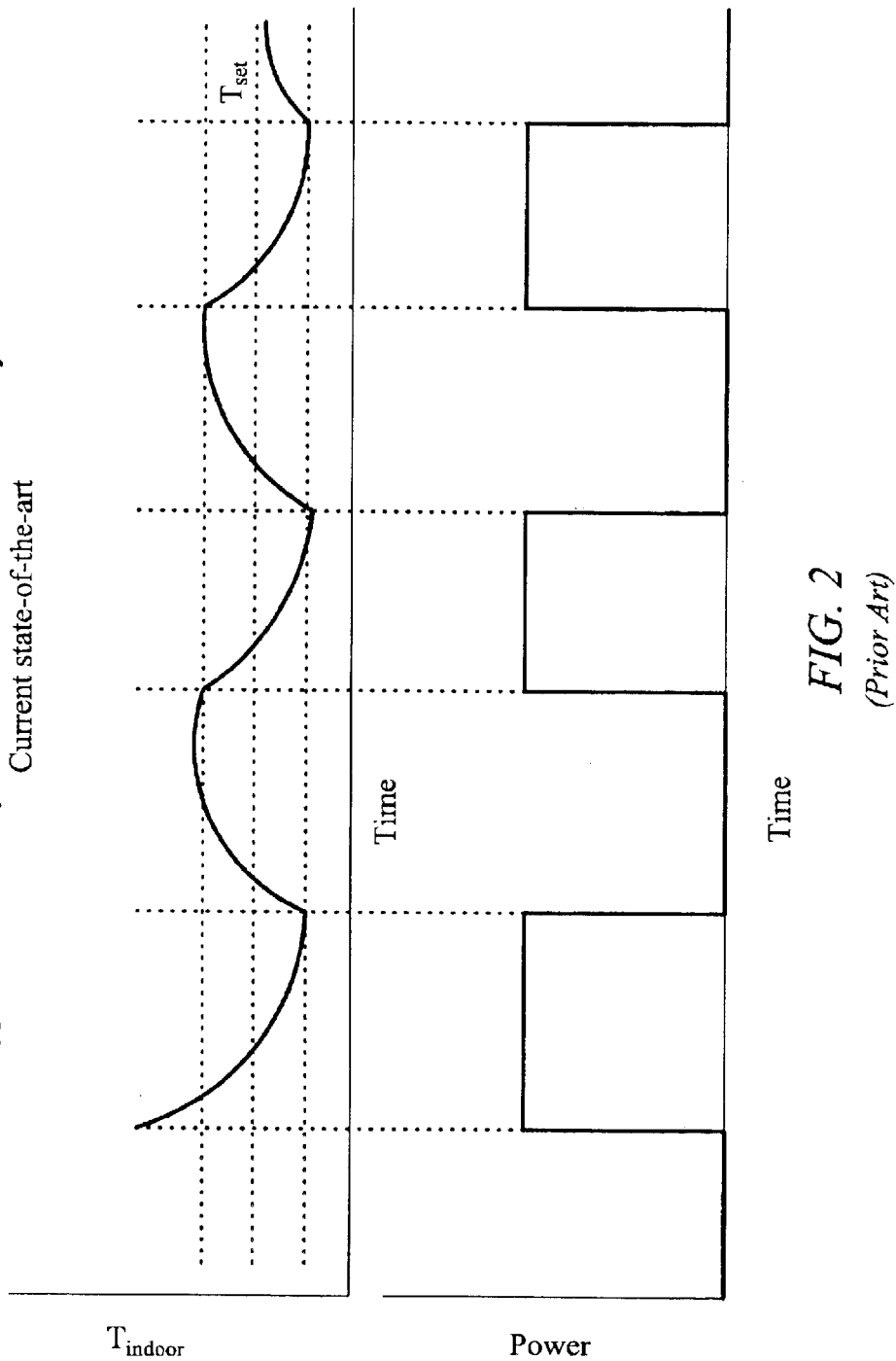
FIG. 2 is an illustration of a graph of a typical prior art thermostat system for an air conditioner.

Referring to FIG. 2, the typical on-off cycle of an air conditioner controlled by a thermostat is schematically illustrated. In the typical on-off operation, the upper and lower indoor temperature limits are set, and represented by Tmax and Tmin. The exponential response curves depict in a general manner the temperature fall from cooling during the power "on" time and the temperature rise during the power "off" time. For simplicity, it is assumed that the outdoor temperature is a fixed temperature above the Tmax. Such on-off cycling leads to so-called cycling losses. In addition, the compressor motor typically operates at a low efficiency when operating at less than full capacity, as shown in FIGS. 3A–3C.

In FIG. 3A, the cooling time spent in each temperature range in the year is illustrated by a bar chart of percent cooling time in the year for a particular five degree range for a zone such as Central California. This bar chart illustrates that temperatures over ninety five degrees are rare. Typically, as shown in the diagram of FIG. 3B, the design point where the capacity of the air conditioner matches the cooling load is 98° F. At lesser temperatures the air conditioner has a substantial over-capacity resulting in frequent on-off cycling at high power consumption as depicted in FIG. 3C for the air conditioner of FIG. 3B rated at 35K Btu/Hr.

From the diagrammatic illustrations of FIGS. 3A–3C it is apparent that for more then 95% of the year the thermal load is much less than the extreme hot days for which the conventional air conditioner is designed to handle. For most parts of the year the air conditioner and particularly the compressor motor operates at fractional load. For single phase a.c. motors used in most residential air conditioners, efficiency drops sharply when the load decreases from full load. A typical efficiency measured as a Coefficient of Performance (defined as cooling output/electrical input) as a function of ambient temperature (which is proportional to thermal load) is shown in the diagrammatic illustration of FIG. 3C for on-off cycling. The dotted steady-state line, for comparison assumes continuous operation at the outdoor temperature with no effect on the controlled environment. Notably after the design point temperature, actual operation is no longer on-off cycling and the dotted steady-state line and actual line are the same.

Figure 4:
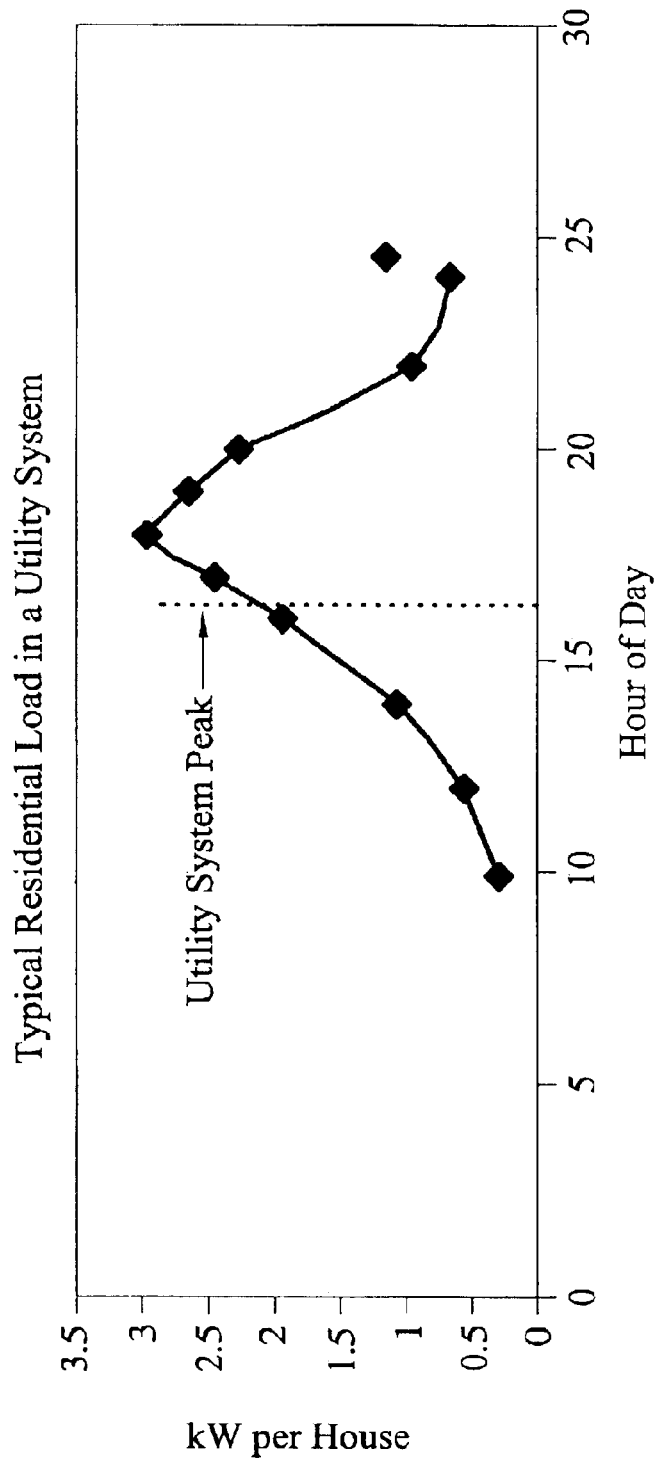
FIG. 4 is an illustration of a graph of residential load and utility system peak.

Referring to FIG. 4, a diagram depicts the typical summer residential load for a utility system in Central California, a climate zone requiring air conditioning to maintain acceptable comfort levels. The diagram is taken from B. Treidler and M. Modera, "Peak Demand Impact of Residential Air-Conditioning Conservation Measures," ACEEE Summer Study Proceedings, Vol.4 1994 and compares the profile of the summer residential load, which is predominantly air conditioning, to the time of the system peak for the Central California utility system. With residential air conditioners going full-blast at the time of the system peak, brown-outs or black-outs may occur that could be avoided with system-wide, strategic control of the air conditioners. Direct utility control of a significant number of air conditioners during critical situations is possible with the described control system. Also and more impotently, the utility can influence usage by a pricing structure that rewards off-peak usage with substantial savings. Not only would this avoid the necessity of constructing additional power plants for increased capacity but would save the utility in a networked power systems from purchasing expensive power on the spot market.

Although the controller 12 includes a remote input 36 that can override the automatic control program that is accessible by a utility, this feature can be omitted or access blocked where exclusive customer control is required or preferred, leaving remote control a customer option.

It is expected that a rate schedule with an aggressive pricing structure will encourage rapid adoption and implementation of the strategic control system described by providing the customer with significant savings in the cost of power, allowing rapid amortization of an installed system.

In the block diagram of FIG. 1 the controller 12 is shown with the inputs from environmental sensors 34 and the allocation of processing to maintaining update data for the look-up table in box 44, generate the required power and frequency for compressor operation in box 18 and generate the required power and frequency for fan operation in box 20. Electronic control of a conventional relay system allows the low power controller 12 to set the state of the compressor motor 46 as "off" or "on," at one of the three capacity levels. From the internal real time clock 24 a timed schedule of operation is adopted and implemented. With continuous real time input from the environmental sensors as the day progresses, the adopted schedule of operation is periodically revised or modified.

In a similar manner the speed of the condenser and evaporation fans is incrementally controlled according to an algorithm programming the optimal fan speed of fan motors 48 for the compressor state under existing and predicted environmental conditions, For this focus, sensing both indoor and outdoor humidity is preferred to predict the change in the indoor humidity as the day progresses and implement adjustments in advance to accommodate an increasing or decreasing humidity level.

Referring now to FIG. 5A, the format of a look-up table for generating in real time, cooling time constants for the actual environment cooled is illustrated. In the table of FIG. 5A, the air conditioner 14 has three levels of operation. Therefore, during each segment of cooling, the rate is calculated for the particular level of operation. In FIG. 5B, the rate of warming is calculated for the periods that the air conditioner is off. From the logs of operation provided by the look-up tables, the rate of cooling at each level of operation, and the rate of warming during the "off" periods can be easily established by averaging. Initially, default rates can be utilized which are approximated by considering the capacity of the air conditioner and the square footage of the environment to be cooled. This allows the costs saving strategy of the controller 12 to be immediately implemented before the more accurate data is generated during actual use.

Figures 6A, 6B:
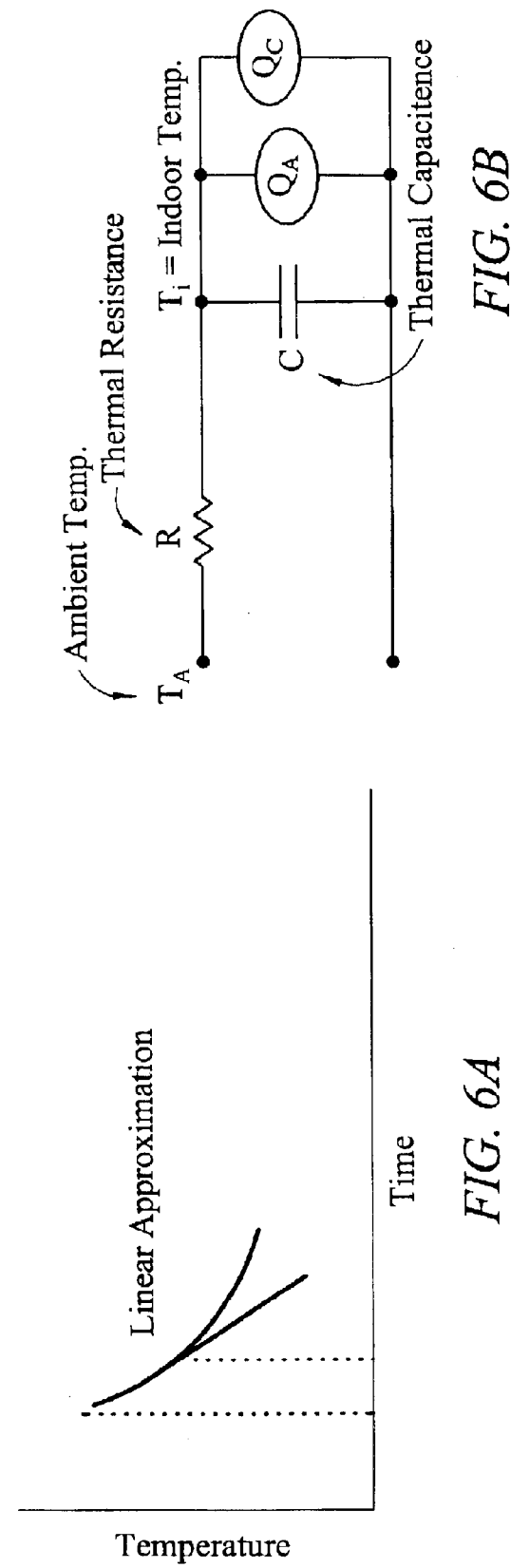
FIG. 6A is an illustration of a graph of approximate time and temperature contents.
FIG. 6B is an electrical diagram for approximating cooling time constants in a structure.

Referring to FIGS. 6A and 6B, the exponential decay circuit of FIG. 6B can be utilized to generate an exponential curve of cooling temperature over time as shown in FIG. 6A. For the temperature ranges under consideration, the curve as a linear approximation of the curve segment is used to facilitate calculations when predicting the operating time to cool the environment to the level desired. With the information generated by the look-up table, the necessary performance predictions can be accurately determined.

Figure 7:
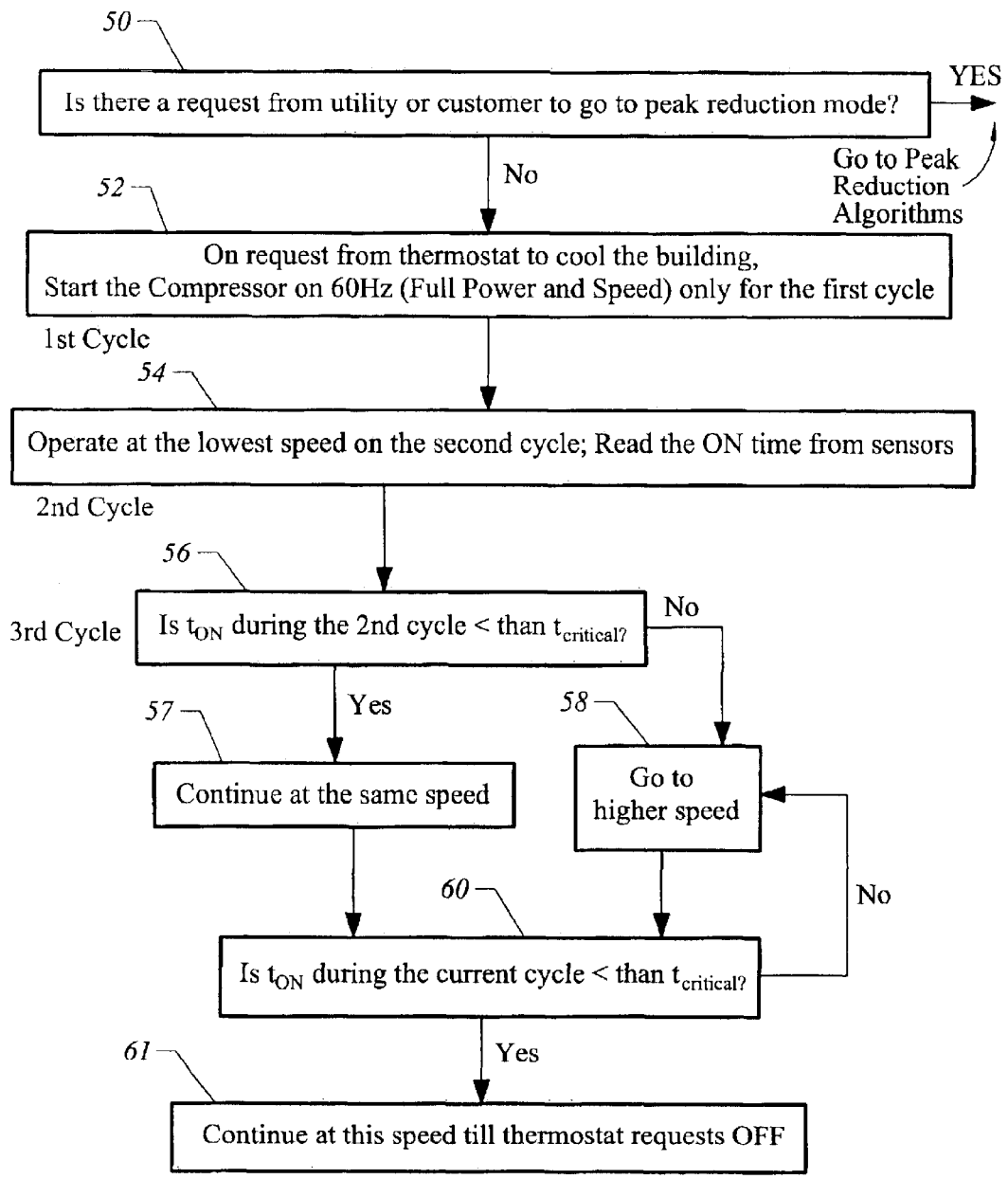
FIG. 7 is a block diagram for an air conditioning system of this invention in normal mode of operation.

Referring now to the flow chart of FIG. 7, the operating procedure for a multi-level air conditioner is set forth during normal operation. Normal operation occurs when there is no request by the utility or customer to go to peak mode alternative as set forth in block 50. For example, normal operation occurs where there may be no peak rate differentials and simple economic operation is desired. Similarly, peak reduction mode as set forth in FIGS. 8A and 8B may be preprogrammed as a standing request for each weekday where peak rates are in effect.

From starting block 50, if no peak reduction request is made or is in place, on a request from the thermostat to start cooling, the compressor starts at full power and speed for the first cycle in block 52. In block 54 the operation shifts to the lowest speed and the "on" time and sensor readings are registered. In block 56 the processor calculates the cooling rate at the lowest capacity level and determines if the time to reach the target temperature is less than t-critical. The time constant "t-critical" is arbitrary and depends on the desire of the user. One may set "t-critical" to one hour, while another with a small environment and an immediate demand might set "t-critical" to one-half hour. Too short a time will result in repeated and inefficient on-off cycling at an inappropriately high level of operation. The longer the t-critical, the more likely a lower capacity level of operation will satisfy objectives. If t-on is less than t-critical, then the process proceeds to block 57 and the air conditioner is continued at this low speed until a periodic current cycle check at block 60. If t-on is still less than t-critical, then the process continues to block 61 until the thermostat requests "OFF."

If the lowest capacity level at block 56 will result in a t-on greater than t-critical then the process proceeds to block 58, where the air conditioner is switched and operated at the next higher level. In block 60 a further calculation determines if t-on is less than t-critical. If yes, then the process proceeds to block 61 and the air conditioner is continued at this next higher capacity level until the thermostat requests "OFF." If no, the process loops back to block 58 where the air conditioner is switched to the highest capacity level for our three level air conditioner 14 of the described preferred embodiment. Presumably, the capacity of the air-conditioner for the controlled environment will meet the t-critical at its highest capacity level. If not, since there is no higher level to sequence, then the air conditioner will continue at the highest speed until the thermostat requests "OFF."

Figure 8A:
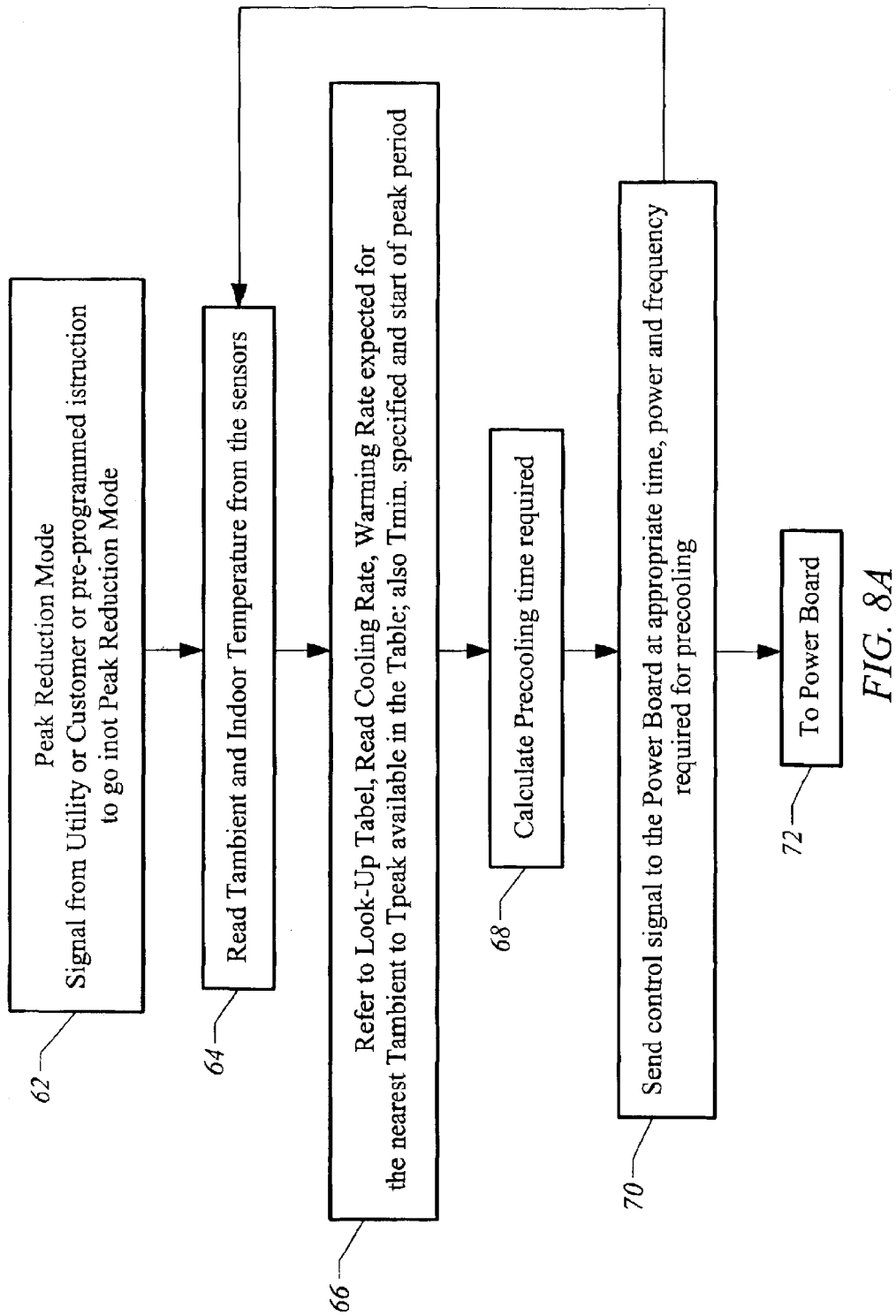
FIG. 8A is a block diagram of the system in FIG. 7 in peak reduction mode before the peak period.
Figure 8B:
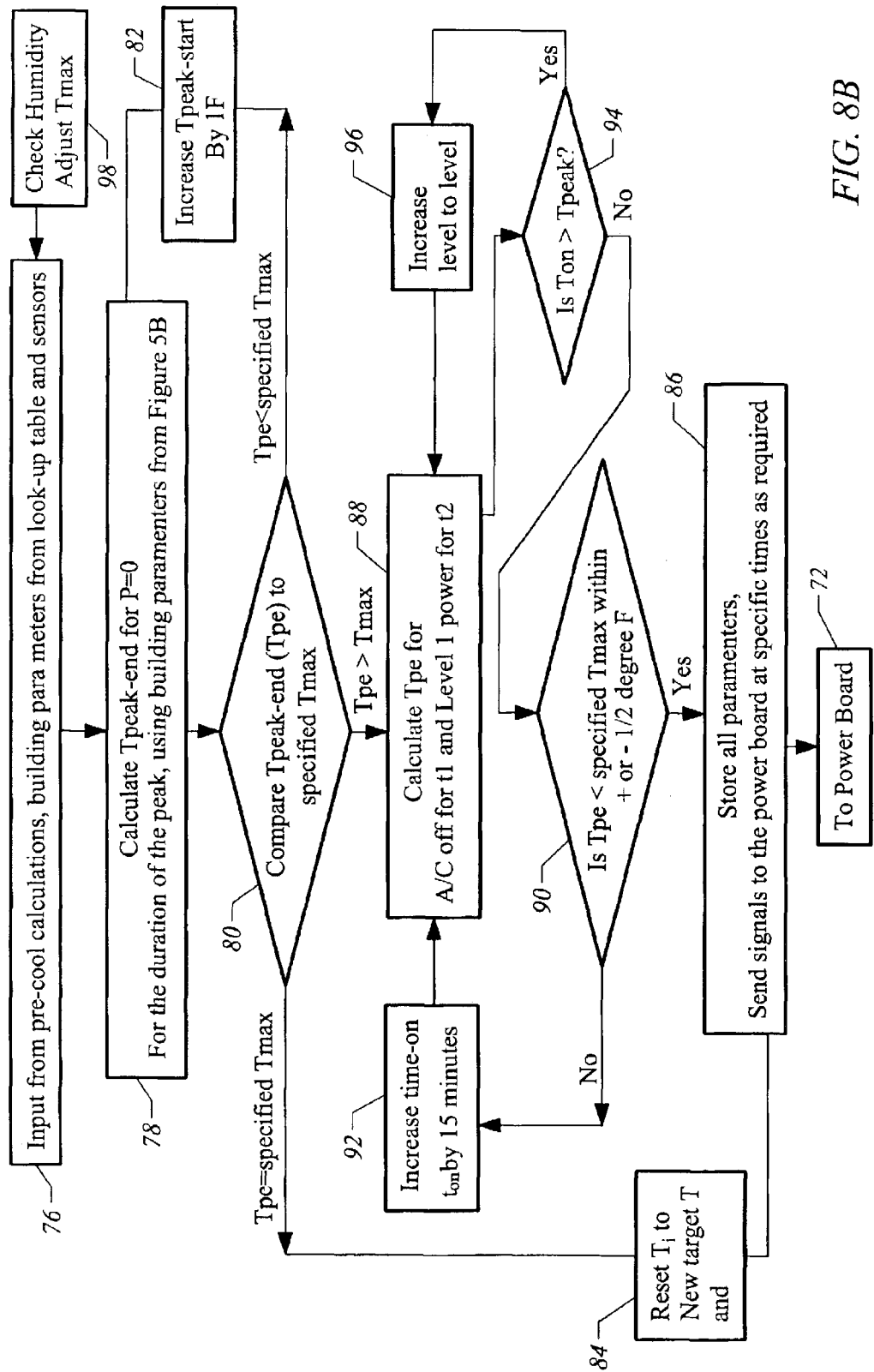
FIG. 8B is a block diagram of the system of FIG. 8A in peak reduction mode during the peak period.

If however, in block 50 of FIG. 7 there is a request to go to peak reduction mode, then the procedure in the block diagram of FIGS. 8A and 8B is implemented. As shown in FIG. 8A, block 62 sets the mode of operation to peak reduction mode. This setting is accomplished by a signal from the utility or customer, or alternately pre-programmed as the default setting for maximized energy savings. It is to be understood that the protocol described provides a basic algorithm for accomplishing the energy savings in a peak rate environment and may be modified or enhanced without departing from the concepts of this invention.

When the signal is received or at a preset time in the morning the system proceeds to block 64 where the sensors are polled to read the indoor temperature and the ambient or outdoor temperature. Proceeding to block 66, the cooling rate for level 1, level 2 and level 3 is determined by reference to the look-up table for the nearest T-ambient and T1, the indoor starting temperature.

Additionally, the time available for cooling, At is determined by subtracting the actual time from the preset start time for the peak power period. The preset minimum comfort level temperature, T-min, is ascertained to calculate the time required to cool to this temperature at the appropriate rates from the look up table.

At box 68 the precooling time for level 1, the lowest level, is calculated and if less than Δt, then precooling at this level is started at peak time minus the calculated precooling time. If precooling time at level 1 is greater than Δt, then precooling time at level 2, the next higher level, is calculated. If precooling time at level 2 is greater than Δt, then precooling at level 3, the highest level is calculated. Precooling is started at peak time minus the precooling time, or immediately if the cooling time is greater than Δt, at all levels.

At box 70 the selected power and frequency for precooling at the appropriate time is stored and sent to the power board at box 72 at the appropriate time.

Because this determination is made in advance of the start of the peak time, the procedure is periodically updated, for example every fifteen minutes before the peak rate start time. In this manner changes in outdoor temperature are continually factored into the calculations in real time. Although allowance for average warming can be included in look-up table rates, the update via loop 74 can account for unexpected warming or cooling allowing a shift in the time for beginning cooling or in the level of cooling to meet the desired T-min or T-target at the start of peak power rates.

Referring to FIG. 8B the schema for operating during the peak rate period is outlined. At block 76, the sensors are polled and the warm-up rate for T-ambient and T2, the indoor temperature at the start of the warming period, is determined. T2 at this time is typically, but not always, the T-min resulting from successful cooling to the lowest comfort level temperature. However, where T-min may be overcooling for a peak rate period, then T2 at peak start is a T-target for the peak period, which is the highest T2 that still allows the air conditioner to remain the offstate during the entire peak period. The T-target is the calculated temperature at the beginning of the peak period that ends with the indoor temperature marginally less than T-max, the maximum comfort level temperature as calculated in FIG. 8B. Also, as noted, where insufficient cooling time exists after a signal to go to peak mode, T1 may not have reached T-min, and T2 is between T-min and T-max.

At block 78 the temperature at the end of the peak power period, T-pe, is calculated using the warm-up rate for T-ambient and T2, the projected start temperature. This calculation should be made in advance of the time the peak period starts, for example, one hour, which allows three more updates at 15 minute intervals for recalculation before the peak period begins. In decision block 80 the T-pe, or peak end temperature is compared with T-max, the maximum comfort level temperature. If T-pe is less than T-max, the air conditioner is programmed to be set for the "OFF" state for the entire duration of the peak rate period and T2 increased by 1° F. at box 82 and the calculation is run again at box 78.

If T-pe is still less than T-max at diamond 80 the loop is run again with T2 increased another degree. This loop is repeated until T-pe=T-max or within a given tolerance, i.e. +or −½ degree. The flow proceeds to box 84 where T-min is raised to the T-target and the precooling calculations are repeated with T-target instead of T-min. The flow proceeds to box 84 where the parameters are stored and the program for sending signals to the power board at the specified times is stored at box 86.

If T-pe is calculated at box 78 to be greater than T-max, even when the start temperature is T-min, then a compromise is required. Although the air conditioner has three levels of operation, and calculations can include running the air conditioner at any one of the levels for a calculated time, the preferred sequence presumes that if the air conditioner is required to be run at all during the peak period after precooling, then this is not an isolated incident and the power grid will be stressed by what is apparently an exceptionally hot day. Operation a lower level, preferably the lowest level, will best achieve the objectives of the utility.

Figure 9:
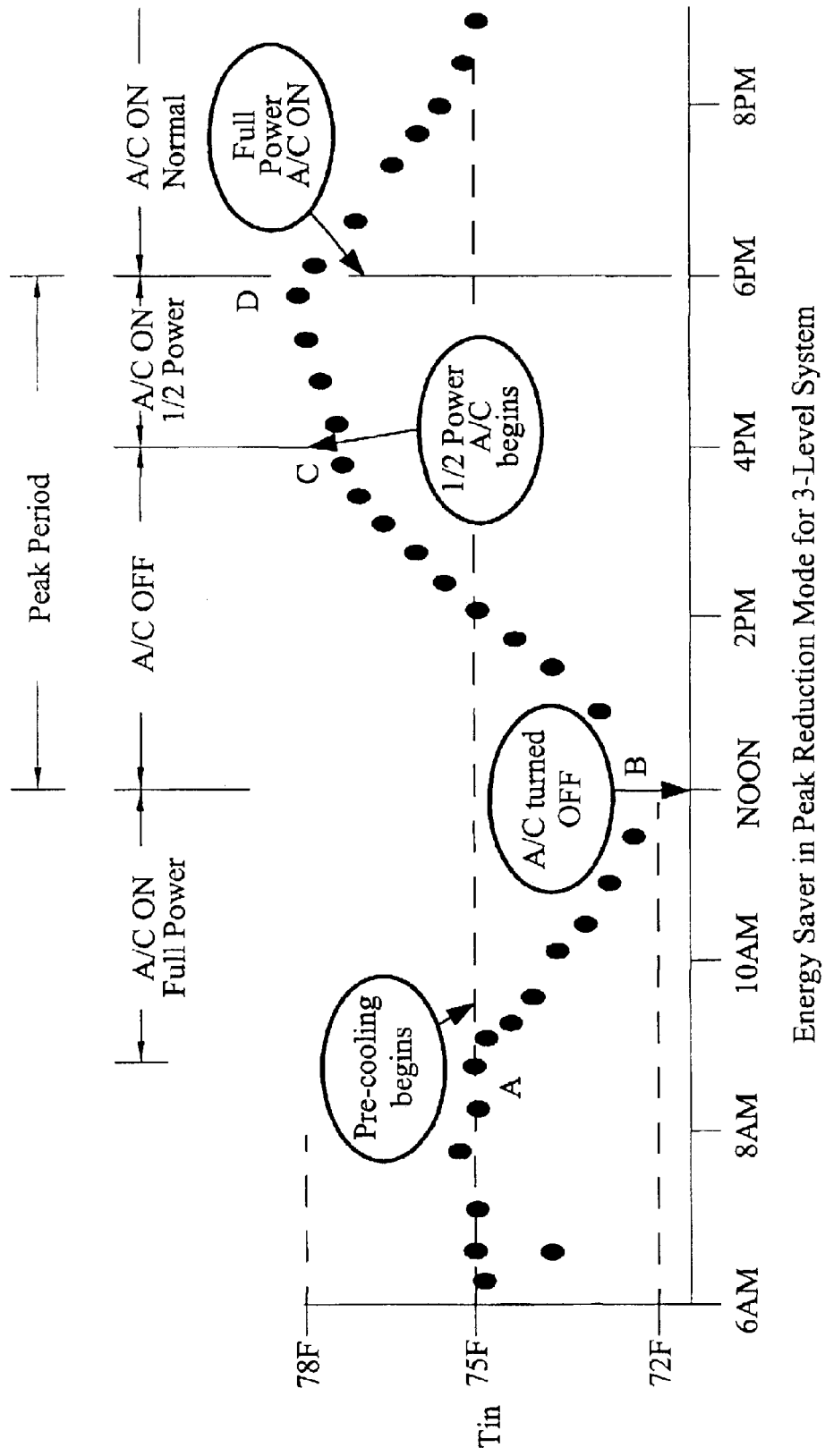
FIG. 9 is an illustration of a graph of a three-level air conditioning system before, during and after peak period.

The compromise operation is particularly useful for peak periods that are extended. For example, where a peak period begins at noon and ends at six p.m., the long period for gradual warming with the air conditioner "off" may exceed the maximum comfort level at the end of the peak period, even if the environment was precooled to reach the minimum comfort level at the beginning of the peak period. In such situations, after precooling, the air conditioner is then turned off, and the environment gradually warms as shown by the graph of FIG. 9. Recognizing that the temperature will exceed the maximum comfort level temperature before the end of the peak period, the air conditioner is turned on, preferably at its lowest level, a calculated time before the end of the peak period. This tempers the temperature rise, as shown, until the end of the peak period where the air conditioner is turned on at full power to return the environment temperature to the desired preset level. This compromise determination is again made with reference to the procedure outlined in FIG. 8B.

Therefore, if at decision diamond 80 T-pe is greater than T-max, the process moves to box 88 where T2, the operation time for the air conditioner at level 1 starts at 15 minutes, usually just before the end of the peak period. If this fails to bring the end temperature under T-max, at decision diamond 90, where the process proceeds to box 86, then an additional fifteen minutes is added at loop box 92. During each loop the cumulative time is compared with the peak period time here 6 hours at decision diamond 94. If at decision diamond 94 the calculated operation time at level 1 exceeds the peak time, then the process proceeds to box 96, which increases the power level to level 2 and returns to box 88. At box 88 the operation time is recalculated for the fifteen minute increments.

While the system is capable of going to level 3, if cooling at level 2 during the entire peak period failed to bring the indoor temperature to T-max, it is preferred that if T-pe still exceeds T-max, then no jump is made to level 3 and T-pe is allowed to exceed T-max with the signal to operate the air conditioner at level 2 during the entire peak period, unless an override instruction is entered.

Figure 10:
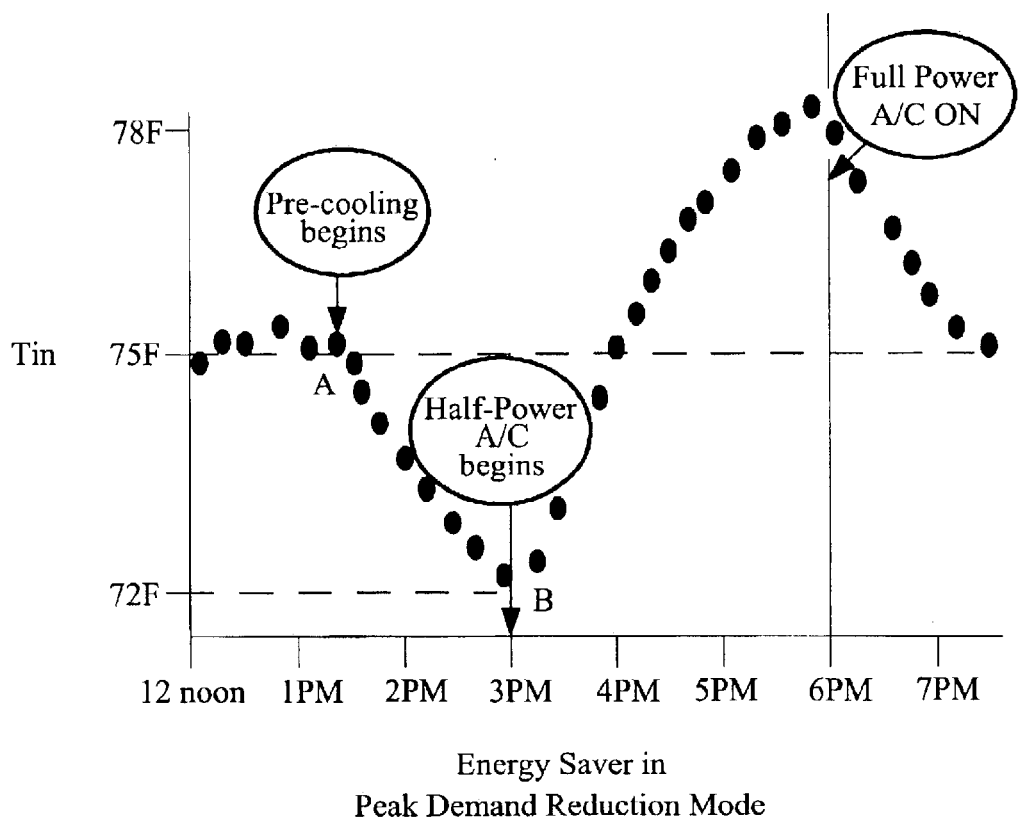
FIG. 10 is an illustration of a graph of a two-level air conditioning system before, during and after a peak period.

It is to be understood that the procedure is simplified for air conditioning systems having two levels of operation, it being presumed that the operation during the peak period will be in the "off" state or the low level state unless changed by an override signal to return the operation to the normal operation of FIG. 7. Referring to FIG. 10, a graph of an air conditioning system having two levels of operation is shown for a shortened peak period of 3 P.M. To 6 P.M.

As shown in the graph, intermittent cooling occurs under normal thermostatic conditions until about 1:30 P.M. when it is determined that precooling is required. The precooling is calculated to drop the temperature to the minimum level at the start of the peak period at 3 P.M. In the particular situation illustrated, only half power is required to temper the rising temperature during the entire peak period which ends at 6 P.M. Thereafter, full power can be applied to drop the temperature from the maximum comfort temperature to the desired thermostatically set temperature.

As noted, between the one half power operation depicted and the off power for the full peak period, the system can power the air conditioner at half power for a duration less than the full peak period according to calculated predictions and periodic updating.

In addition, certain adjustments can be preprogrammed or optionally set. For example, the maximum comfort temperature T-max set by the occupant in one embodiment represented by box 98 is automatically lowered by one or two degrees when humidity exceeds a designated level, for example 80%. Additionally, T-min, the minimum comfort level temperature in another embodiment is set to a lower temperature for enhanced precooling, particularly, when it is expected that the air conditioned premises is unoccupied. This can be reset to the normal comfort minimum when the premises is occupied.

In addition, while the energy savings are not as great for fan motors when compared with compressor motors, strategic control of fan speed and the timing of fan operation can indeed maximize savings on energy costs while maintaining a comfortable environment.

Typically, fan speed can be controlled at any desired speed by a fan control inverter. The efficiency, however, may vary. A table of power draw versus fan frequency enables efficiency for each frequency to be calculated. Depending on the level of compressor operation, an efficient frequency within an acceptable range for that compressor level can be selected.

Figure 11:
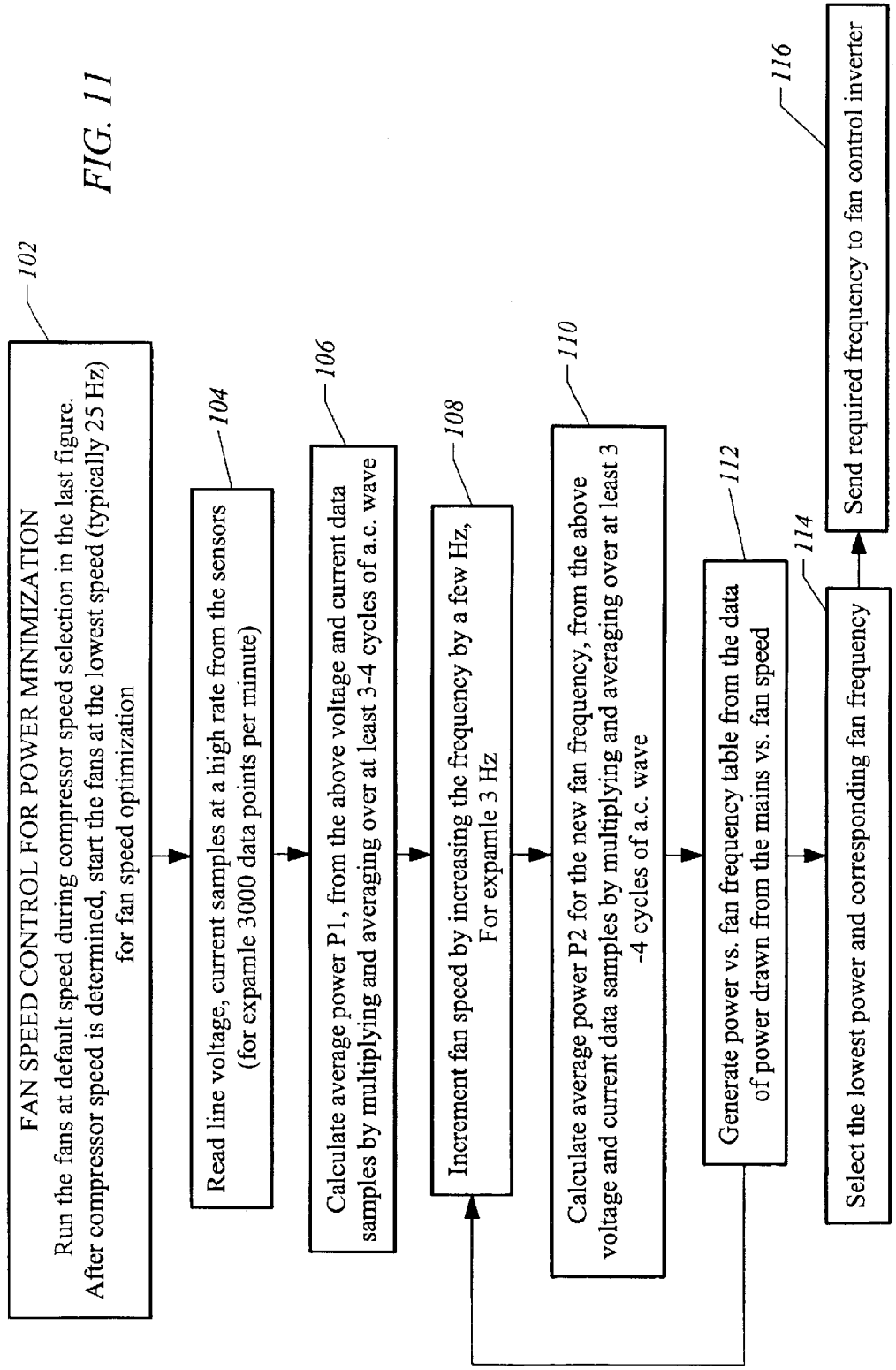
FIG. 11 is a block diagram of a fan speed control procedure.

Referring to FIG. 11, in box 102 the fans are operated at a default speed during selection of the operating level of the compressor. Once determined, the fan operates at the lowest speed, here 25 Hz, and the optimization program begins. In box 104, the line voltage and current is sampled from the sensors, and in box 106, average power P1 is calculated. In box 108, speed is increased an incremental amount, for example 3 Hz and in box 110 average power P2 for the new fan frequency is calculated over 3–4 cycles of the a.c. power wave. In box 112 a fan frequency table is generated using the results of the power calculations in box 110. From box 112 the process loops back to box 108 where the frequency is raised an increment and power is again calculated in box 110. This continues through the acceptable speed range and then the process moves to box 114 where the fan frequency in the range with the lowest power consumption is selected. The selected frequency is sent to the fan control inverter in box 116.

This routine should be periodically run during the system lifetime to insure the optimal fan speed is used at each level of compressor operation.

Figure 12:
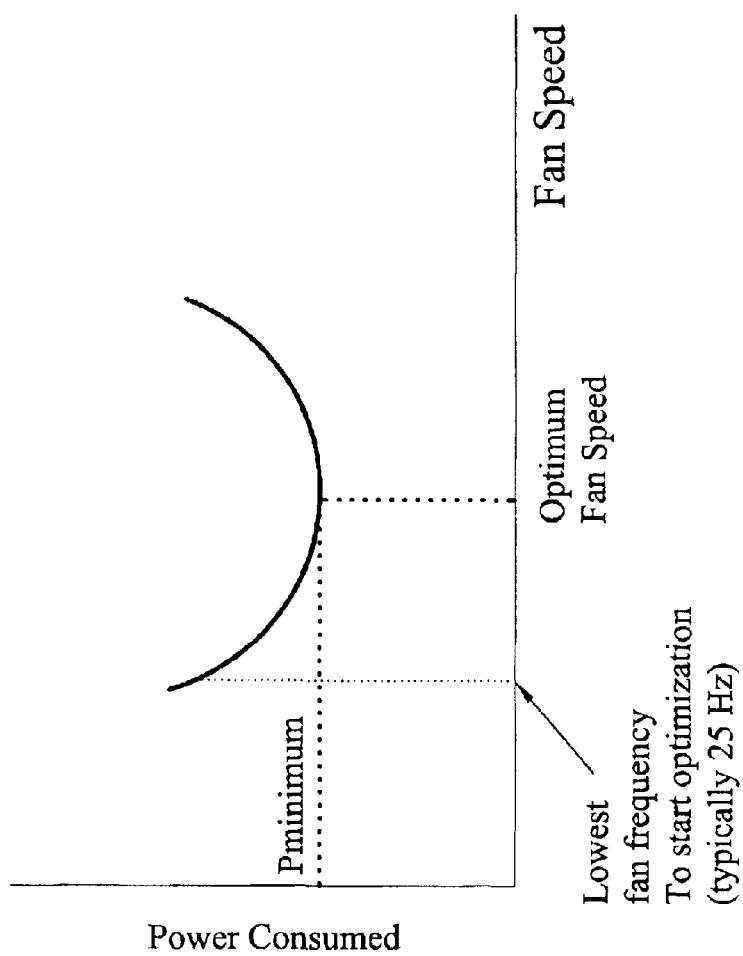
FIG. 12 is a illustration of a graph of fan speed and power consumption.

As shown in FIG. 12, the optimum fan speed may not be the lowest speed. In addition to selecting an optimal fan speed, the fan operation includes adjustments to extract the maximum cooling from the air conditioning system. A time delay is preferably included to keep the fans running after the compressor stops, for example an extra five minutes, to discharge heat at the condenser and extract additional cooling at the evaporator.

It is to be understood that the foregoing process may be modified according to the customer and utility objectives. For example as utilities can better monitor real time power consumption during peak periods, it may be more advantageous to briefly operate the air conditioner at a reduced level, or for that matter at its full level at the beginning of the peak period than at the end. Also, depending on the power alert stage, the utility can have the option to disregard the maximum customer comfort level and operate controlled air conditioning systems at the minimum power level during the entire peak period or even an extended peak period. Or, from the customer cost-saving perspective, it may provide a better saving to meet the comfort level by operating the air conditioner at full operation for fifteen minutes at the end of the peak period, than at level 2 for thirty minutes. These modifications and other similar modifications can be part of the operating program and are considered to be within the scope of the teachings of this description.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A strategic-response control system for operation of an air conditioning system in an environment with increased power rates during a designated peak period, the air conditioning system including a power board for alternately operating the air conditioning system in an operating state and an "off" state, the control system comprising:

a controller having a processor and a real time clock for coordinating operations of the processor with the timing of the designated peak period;

an indoor temperature sensor electronically connected to the controller unit for generating an input signal to the processor representing the indoor temperature;

an outdoor temperature sensor electronically connected to the controller unit for generating an input signal to the processor representing the outdoor temperature; and, an operating program having operating parameters including a maximum comfort level temperature, a minimum comfort level temperature and a warmup rate for the environment in which the air conditioner operates, and, having a processing procedure for determining a time period for precooling the environment before the peak period begins;

wherein on activation, the processor determines a time period of precooling the environment before the peak period begins and signals the power board at the determined times to enter an operating state for precooling and an "off" state at the beginning of the peak period.

2. The strategic-response control system of claim 1 wherein the air conditioning system has an operating state with multiple power levels of operation including a low power level of operation, and the processing procedure includes a process for determining if the maximum comfort level will be exceeded during the peak period in the off state of operation and determining a time period for low power level of operation during the peak period to prevent the environment from exceeding the maximum comfort level, and, signaling the power board at the determined time to enter a low power level of operation.

3. The strategic-response control system of claim 1 wherein the operating program includes an algorithm for calculating the warmup rate for the environment for a particular indoor temperature and an outdoor temperature.

4. The strategic-response control system of claim 1 wherein the controller includes an updatable memory and a look-up table for recording and retrieving data on indoor temperature, outdoor temperature and warmup rates wherein cooling time constants can be determined for determining cooling rates at particular indoor and outdoor temperatures.

5. The strategic-response control system of claim 4 wherein the air conditioning system has multiple power levels of operation and the look-up table has data for determining warmup rates and cooling rates at each power level of operation.

6. The strategic-response control system of claim 1 wherein the air conditioning system includes an air conditioner with a compressor having a compressor fan and an evaporator having an evaporator fan, the control system further comprising an adjustable fan speed control that controls the compressor fan and an adjustable fan speed control controls the evaporator fan.

7. The strategic-response control system of claim 6 wherein the air conditioning system has multiple power levels of operation and the operating program has a processing procedure for determining the most efficient fan speed for optimizing cost savings at each power level of operation of the air conditioning system.

8. The strategic-response control system of claim 1 wherein the air conditioning system has a normal mode under thermostatic control and the strategic-response control system is activated to override the thermostatic control by the user of the environment.

9. The strategic-response control system of claim 8 wherein the strategic-response control system is alternately activated remotely by a power utility.

10. The strategic-response control system of claim 2 wherein the control system further comprises a humidity sensor electronically connected to the controller unit for generating an input signal to the processor representing an outdoor humidity level and the operating program has a procedure for adjusting the operating parameters in response to the outdoor humidity level.

11. A method for strategically controlling an air conditioning system in an environment with increased power rates during a designated peak period that is alternately operated in an operating state and an "off" state by the steps of:
  (1) designating a minimum comfort level temperature in the environment;
  (2) precooling the environment to a temperature no less than the designated comfort level temperature before the beginning of the designated peak period by operating the air conditioning system in the operating state; and,
  (3) operating the air conditioning system in the "off" state after the peak period begins.

12. The method for strategically controlling an air conditioning system of claim 11 wherein the operating state of the air conditioning system has multiple power levels including a low power level by the further steps of:
  (1) designating a maximum comfort level temperature in the environment;
  (2) determining if the maximum comfort level temperature will be exceeded in the peak period by operating the air conditioning system in the "off" state during the peak period; and,
  (3) operating the air conditioning system in the low power level for at least a part of the peak period.

13. The method for strategically controlling an air conditioning system of claim 12 by the further step of:
  (1) determining the period of time the air conditioning system is to be operated at the low power level of operation to maintain the temperature in the environment below the maximum comfort level temperature during the peak period; and,
  (2) operating the air conditioning system at the low power level of operation for the determined period of time during the peak period.

14. The method for strategically controlling an air conditioning system of claim 13 wherein the step of determining the period of time the air conditioning system is to be operated at the low power level includes the steps of:
  (1) sensing the indoor temperature;
  (2) sensing the outdoor temperature;
  (3) determining the warmup rate for the environment at the sensed indoor temperature and outdoor temperature; and,
  (4) calculating the time period for cooling at the low power level to prevent the environment from reaching the maximum comfort level temperature before the end of the peak period.

15. The method for strategically controlling an air conditioning system of claim 14 wherein the air conditioning system has at least three levels of operation and the additional step of:
  (1) determining if the calculated time period for cooling at the low power level exceeds the time remaining in the peak period at the time of the calculation;
  (2) if the calculated time period for cooling at the low power level does exceed the time remaining in the peak period, then determining the period of time the air conditioning system is to be operated at the next power level above the low power level;
  (3) operating the air conditioning system at the next power level above the low power level for the determined period of time during the peak period.

16. The method for strategically controlling an air conditioning system of claim 14 wherein the step of determining the period of time the air conditioning system is to be operated at the low power level is repeated periodically before and during the peak period.

17. The method for strategically controlling an air conditioning system of claim 14 wherein the step of determining the period of time the air conditioning system is to be operated at the low power level includes the further steps of:
  (1) sensing the outdoor humidity level,
  (2) adjusting the maximum comfort level temperature if the outdoor humidity level exceeds a predetermined level.

18. The method for strategically controlling an air conditioning system of claim 12 wherein the air conditioning system includes a compressor with a compressor fan and an evaporator with an evaporator fan with a speed control for the compressor fan and the evaporator fan, including the added steps of:
  (1) determining the optimum operating speeds of the compressor fan and evaporator fan for each of the multiple power levels of operating; and,
  (2) operating the compressor fan and evaporator fan at the optimum operating speed for each power level of operating the air conditioning system.

19. The method for strategically controlling an air conditioning system of claim 11 wherein the air conditioning system is operated in a normal mode under conventional thermostatic mode and is operated in a strategically controlled method when pre-set by a user of the environment.

20. The method for strategically controlling an air conditioning system of claim 11 wherein the air conditioning system is operated in a normal mode under conventional thermostatic mode and is operated in a strategically controlled method when remotely activated by a utility.

* * * * *